(12) United States Patent
Lewis et al.

(10) Patent No.: US 7,051,832 B2
(45) Date of Patent: May 30, 2006

(54) MATERIAL HANDLING VEHICLE WITH DUAL CONTROL HANDLES

(75) Inventors: Robert J. Lewis, Binghamton, NY (US); Richard M. Day, Whitney Point, NY (US); Kurt R. Werner, Auburn, NY (US); H. Scott Ryan, Skaneateles, NY (US)

(73) Assignee: The Raymond Corporation, Greene, NY (US)

( * ) Notice: Subject to any disclaimer, the term of this patent is extended or adjusted under 35 U.S.C. 154(b) by 140 days.

(21) Appl. No.: 10/631,237

(22) Filed: Jul. 31, 2003

(65) Prior Publication Data

US 2005/0023069 A1    Feb. 3, 2005

(51) Int. Cl.
*B60R 26/00* (2006.01)

(52) U.S. Cl. .................................. 180/321

(58) Field of Classification Search ........ 180/321–326; 280/93.502, 778; 187/222; 74/473.12, 471 R
See application file for complete search history.

(56) References Cited

U.S. PATENT DOCUMENTS

| | | | | |
|---|---|---|---|---|
| 1,125,184 A | * | 1/1915 | Schleicher | ............ 180/23 |
| 1,672,212 A | * | 6/1928 | Hale | ............ 180/24.01 |
| 2,593,643 A | * | 4/1952 | Woolf | ............ 200/518 |
| 3,237,709 A | * | 3/1966 | Sherwen | ............ 180/321 |
| 3,369,682 A | * | 2/1968 | Breault | ............ 414/459 |
| 3,604,528 A | | 9/1971 | Williamson | |
| 3,750,834 A | | 8/1973 | Luft | |
| 3,785,325 A | * | 1/1974 | Mycroft | ............ 440/12.57 |
| 4,016,948 A | | 4/1977 | Kuester | |
| 4,141,591 A | | 2/1979 | Spicer | |
| 4,147,227 A | * | 4/1979 | van der Lely | ............ 180/322 |
| 4,212,250 A | | 7/1980 | Burgess | |
| 4,287,966 A | * | 9/1981 | Frees | ............ 187/231 |
| 4,318,451 A | | 3/1982 | Liggett | |
| 4,505,356 A | * | 3/1985 | Baier et al. | ............ 180/322 |
| 4,638,883 A | | 1/1987 | Miriizumi et al. | |
| 4,790,711 A | * | 12/1988 | Calaway | ............ 414/635 |
| 4,846,581 A | | 7/1989 | Osterlund et al. | |
| 4,919,233 A | * | 4/1990 | Larsen et al. | ............ 187/227 |
| 5,190,118 A | | 3/1993 | Yelton | |
| 5,226,497 A | | 7/1993 | Beaton | |
| 5,251,722 A | * | 10/1993 | Scratchard | ............ 180/321 |
| 5,285,867 A | | 2/1994 | Pedersen et al. | |
| 5,346,035 A | * | 9/1994 | Ueda et al. | ............ 180/329 |
| 6,015,019 A | | 1/2000 | Grimes et al. | |
| 6,564,906 B1 | * | 5/2003 | Haack et al. | ............ 187/222 |
| 6,679,349 B1 | * | 1/2004 | Pollish, Jr. | ............ 180/326 |

FOREIGN PATENT DOCUMENTS

| | | | | |
|---|---|---|---|---|
| JP | 60174363 A | * | 9/1985 | |
| JP | 02024265 A | * | 1/1990 | |
| JP | 03143781 A | * | 6/1991 | |
| JP | 04103476 A | * | 4/1992 | |

* cited by examiner

*Primary Examiner*—Paul N. Dickson
*Assistant Examiner*—Laura B. Rosenberg
(74) *Attorney, Agent, or Firm*—Quarles & Brady, LLP

(57) ABSTRACT

A material handling vehicle includes first and second control handles positioned at opposing ends of an operator compartment. The first control handle is positioned adjacent the forks for driving the vehicle in a fore or forks first direction, and the second control handle is positioned adjacent the back of the vehicle for driving the vehicle in the aft or forks trailing direction. The control handles provide stability for the operator and an intuitive operator interface irrespective of direction of travel.

22 Claims, 6 Drawing Sheets

MATERIAL HANDLING VEHICLE WITH DUAL CONTROL HANDLES

BACKGROUND OF THE INVENTION

The present invention relates to material handling vehicles, and more particularly to a material handling vehicle with multiple control handles for operation in a variety of operator orientations.

Material handling vehicles commonly found in warehouse and factory environments include, for example, vehicles in which the operator normally stands on a platform at the rear of the truck, at the end opposite of a load carrying or load handling mechanism, typically employing forks to lift and transport material. To provide an efficient flow of goods in such facilities, operators of these vehicles typically orient their bodies in the most comfortable position for adequate visibility to drive the material handling vehicles in both a forks first direction, with the vehicle forks leading in the direction of travel, and tractor first direction, in which the vehicle forks trail in the direction of travel.

Although in a typical vehicle there are a variety of possible operator orientations, when traveling, an operator will favor positions that maximize comfort and visibility for forks first and tractor first travel. Generally, one operator orientation is used more frequently than the others. The prevalent orientation varies with vehicle design, from facility to facility, within a given facility, and even from operator to operator. There is, therefore, a fundamental need to provide stability to the operator when traveling for all likely orientations, while maintaining operator comfort and the maximum productivity potential of the vehicle.

For these reasons, designers of lift trucks have developed a number of different operator compartment configurations. Available configurations include both standing and seated configurations in which the operator faces either generally to one side or to the front/rear of the truck. Vehicles designed for a standing operator (stand-up vehicles), include both side stance configurations where the operator generally operates the truck when standing facing the left side of the truck and, fore/aft configurations in which the operator may either stand facing the load or away from the load. For each of these configurations, designers have further provided various methods to accommodate operator stability for travel in both the forks first and tractor first directions, and to provide each design with a reasonable degree of comfort for the operator, while ensuring the capability for vehicle productivity. Stand-up vehicle designs, for example, typically impart stability, in part, through hand operated vehicle controls that provide both stability and the means to control the operation of the vehicle. Operator stability when traveling is accomplished through a combination of solid footing, pads and covers that embrace portions of the operators body, hands on the vehicle controls and an operator advanced knowledge of the commanded vehicle motions.

Typical prior art stand-up vehicles utilize the same control elements to command travel in either direction and for either stance orientation. That is, the truck operator manipulates the same steering device, travel control, and deadman foot control regardless of stance orientation. In the case of stand-up trucks configured in the fore/aft sense, although designed to be intuitive for bi-directional control, some operators nonetheless find the controls more convenient for forks first travel than for tractor first travel. Furthermore, these controls often do not provide maximum comfort for the widest possible range of operator sizes, as the operator must reach beside and slightly rearward of his or her centerline in order to control the vehicle travel speed when facing in the tractor first direction.

BRIEF SUMMARY OF THE INVENTION

In one aspect, the present invention provides a material handling vehicle including a first control handle mounted for access by an operator facing a first direction, and a second control handle mounted for access by an operator facing a second direction. The first control handle is rotational in the first direction to produce a control signal selecting motion in the first direction, while the second control handle is rotational in the second direction to produce a control signal selecting motion in the second direction. A traction system receives the control signals and produces motion in the selected direction and at a selected speed of travel.

In another aspect, the present invention provides a material handling vehicle including an operator compartment, a first operator control handle for selecting a direction and a speed of travel, and a second operator control handle for selecting a direction and a speed of travel. The first control handle is mounted to a first end of the operator compartment and is configured for operation in a first or second direction, while the second operator control handle is mounted to the compartment at a second end opposite the first end, and is configured for operation in the first or second direction. A traction system is controlled by the first and second control handles to drive the lift truck in a selected direction, wherein the operator can drive the vehicle while facing either of two different directions.

In another aspect of the invention, a lift truck is provided including a fork, an operator station from which the operator drives the lift truck, and a traction system. A first operator control is provided near the forks, and a second operator control is similarly mounted near an opposing end of the lift truck, opposite the forks. The traction system is connected to at least one of the first and second control handles to receive a control signal or signals indicative of a desired direction of travel selected from the first and second control handles, such that the operator can control the vehicle from either of the two handles.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
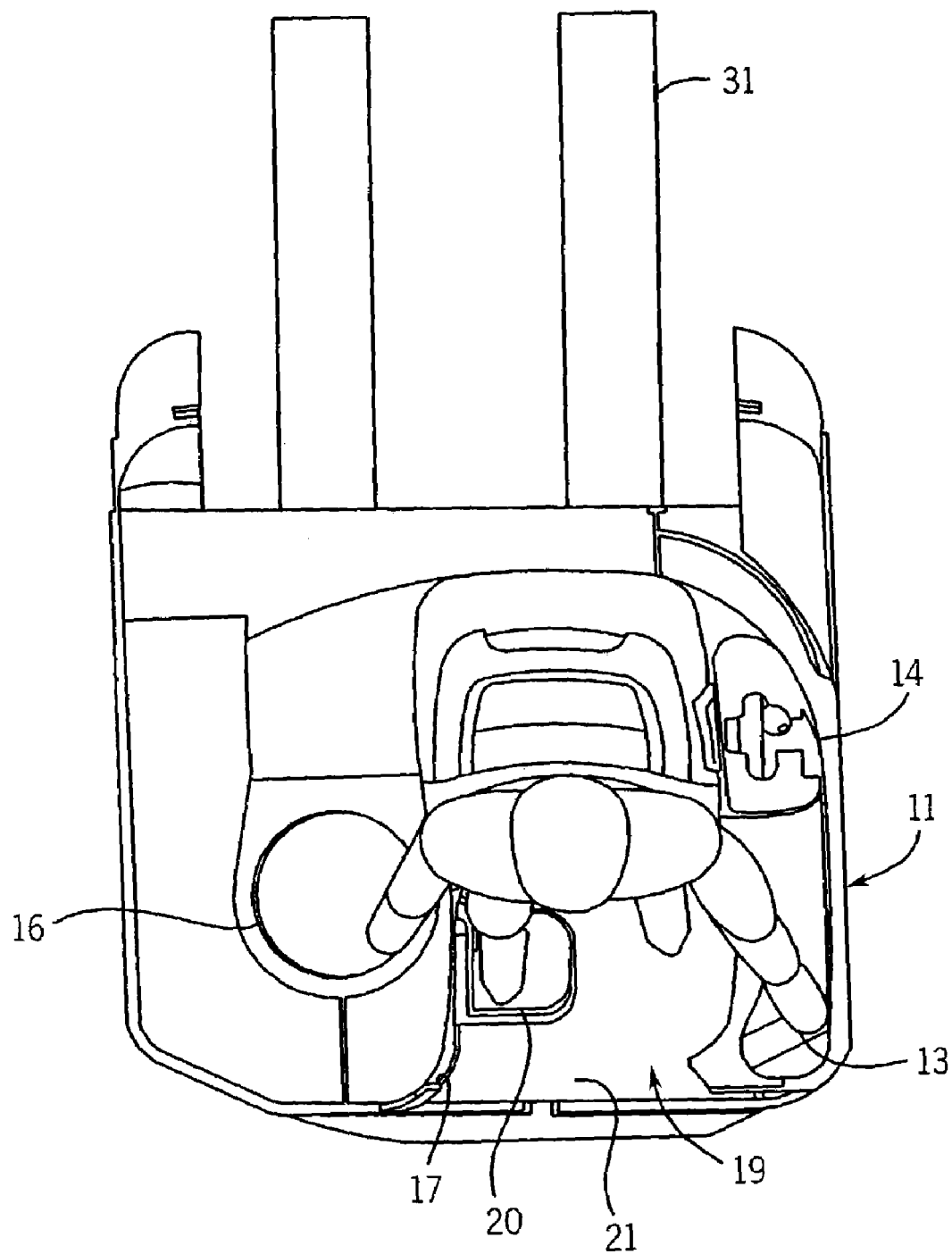
FIG. 1 is a top view of a material handling vehicle constructed in accordance with the present invention with the operator facing aft.

Referring now to the Figures, and more particularly to FIG. 1, a material handling vehicle constructed in accordance with the present invention is shown. The vehicle as shown is a stand-up, fore-aft stance configured lift truck 10 designed to allow the operator to operate the vehicle from different operator orientations. Here, the operator can stand facing in the direction of travel, whether travel be in the forks first or tractor first direction. The truck 10 includes an operator compartment 11 comprising an enclosure 17 with an opening 19 for entry and exit of the operator.

The compartment 11 includes a first multi-function control handle 14 which is mounted to the enclosure 17 at the front of the operator compartment 11 proximate the forks 31, an aft control handle 13 positioned at the back of the compartment 11, and a floor switch 20 positioned on the floor 21 of the compartment 11 in a location selected to allow the operator to easily access the floor switch 20 when facing either the fore or aft direction. A steering wheel 16 is also provided in the compartment 11 and, like the floor switch, is positioned to allow control by the operator when facing either the fore or aft directions. The position of multi-function control handle 14 is selected to control the speed and direction of travel of the lift truck 10 when the operator is facing the forks 31, and the position of aft control handle 13 is selected to control the motion of the lift truck 10 when the operator is facing in the aft direction, as described more fully below.

Figure 2:
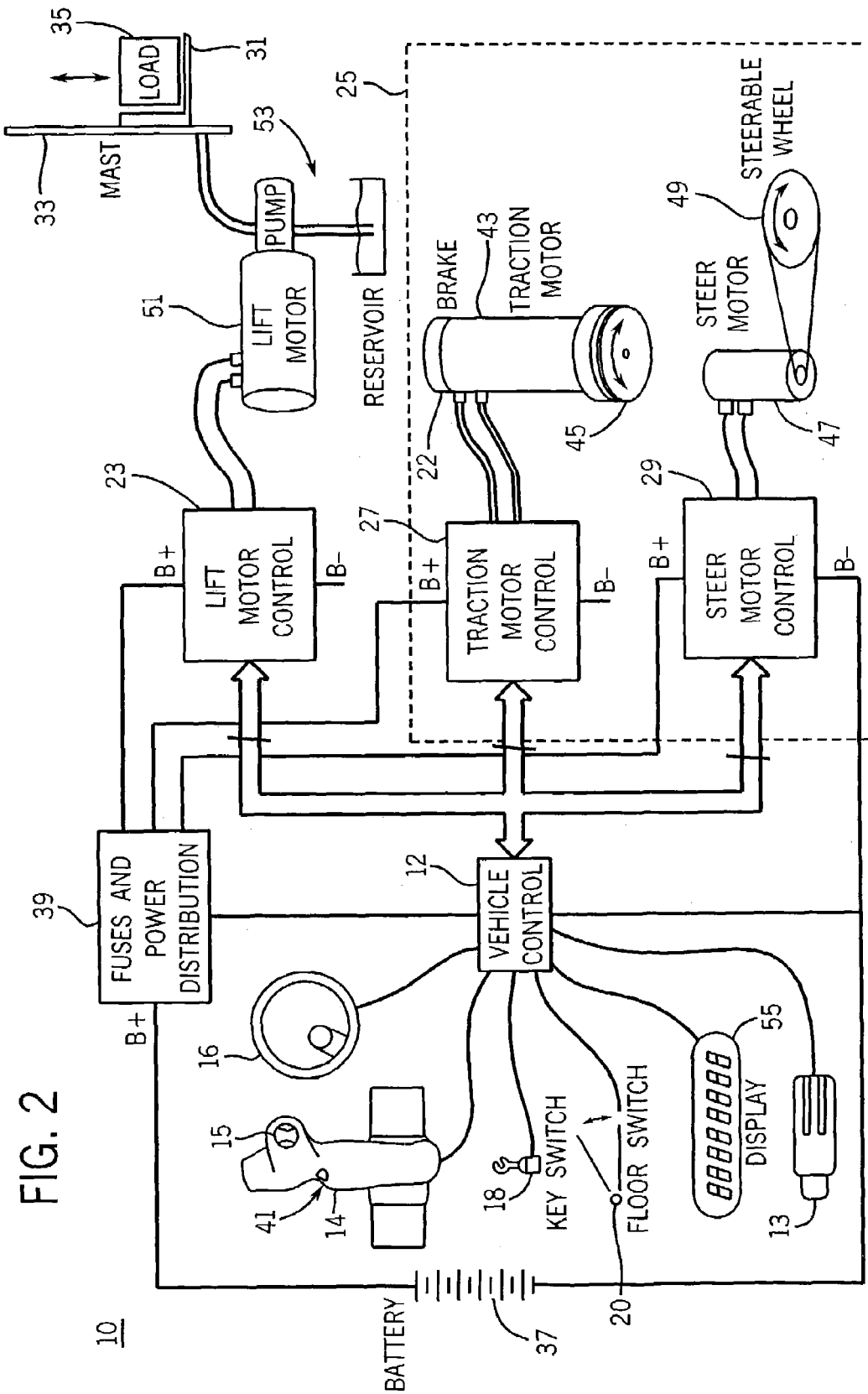
FIG. 2 is a block diagram of the lift truck constructed in accordance with the present invention.

Referring now to FIG. 2, a block diagram of a typical lift truck 10 in which the present invention can be provided is illustrated. The lift truck 10 comprises a vehicle control system 12 which receives operator input signals from the aft control handle 13, the multi-function control handle 14, the steer wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving and steering the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25, and lift motor control 23 through a bank of fuses or circuit breakers 39.

As noted above the operator inputs include a key switch 18, floor switch 20, steering wheel 16, a multi-function control handle 14, and an aft control handle 13. The key switch 18 is activated to apply power to the vehicle control system 12, thereby enabling the lift truck 10. The floor switch 20 provides a deadman braking device, disabling travel of the vehicle unless the floor switch 20 is activated by the operator, as described below.

Figure 3:
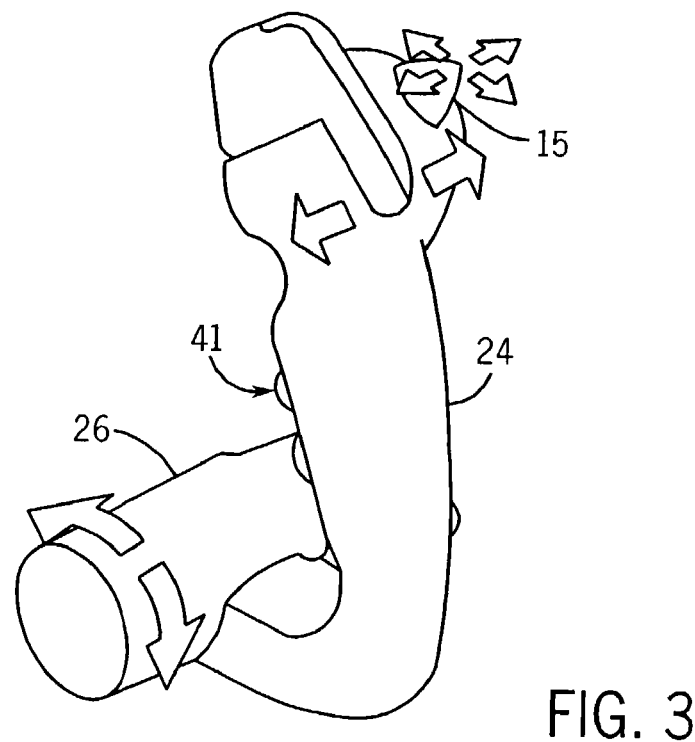
FIG. 3 is a perspective view of a multi-function control handle of FIGS. 1 and 2.

Referring now also to FIGS. 1 and 3, the control handle 14 is a multi-function control which includes both an upright, substantially vertical section 24, and a horizontal section 26, the vertical 24 and horizontal 26 sections together providing a number of control functions for the lift truck 10. The horizontal section 26 includes a transducer such as a potentiometer which provides a travel direction and speed command signal to the vehicle control system 12 and is configured to provide intuitive control for an operator facing the fore of the vehicle 10. The horizontal section 26 is rotated forward towards the forks 31 of the vehicle 10 to provide a forks first directional and speed command and backwards away from the forks 31 to provide a tractor first directional and speed signal to the vehicle control 12, the final speed of travel being determined in both cases based on the degree of rotation. The vertical section 24 includes a four-way switch 15 located on the top of the handle 14 which provides a tilt up/down function when activated in the forward and reverse directions and a sideshift right and left function when activated to the right and left directions. A plurality of control actuators 41 located on the vertical section of the handle 14 provide a number of additional functions, and can include, for example, a reach push button, a retract push button, and a horn push button. The vertical sectional portion further includes a transducer such as a potentiometer providing a lift function control signal to the vehicle control system 12. A number of other functions could also be provided, depending on the construction and intended use of the lift truck 10.

Figure 4:
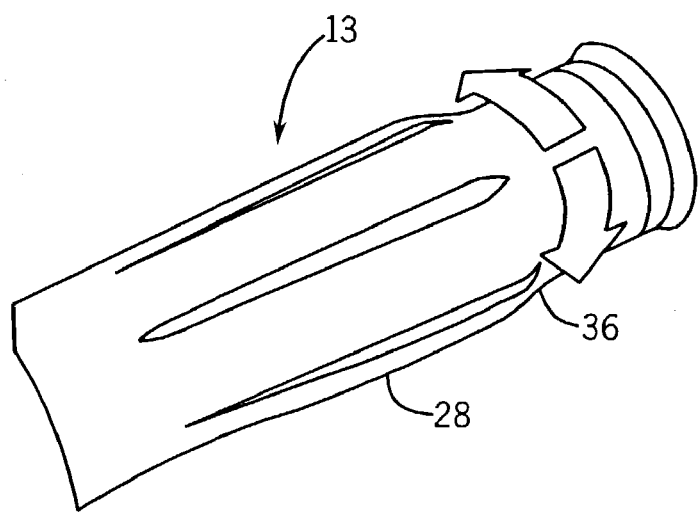
FIG. 4 is a perspective view of an aft control handle of FIGS. 1 and 2.

Referring now to FIGS. 1, 2, and 4, the aft control handle 13 is a horizontally mounted handle which includes a transducer such as a potentiometer for providing directional and speed control signals to the vehicle control system 12, as described with reference to the horizontal section of the control 14 described above. The aft control handle 13 is configured to operate intuitively, and similarly to the control handle 14, for an operator facing the aft of the vehicle. The aft control handle 13 is rotated forward toward the aft of the lift truck 10 to provide a tractor first directional signal and speed command, and in the opposite direction, toward the fore of the vehicle, to provide a forks first directional and speed command. Therefore, irrespective of the direction that the operator is facing, a control handle with intuitive operation is provided. When facing either direction, a control is provided which is rotatable in the direction that the operator is facing to cause the lift truck 10 to move in that direction, and which is also rotatable in the opposite direction to cause the lift truck 10 to move in the opposite direction. As described above, the speed request signal provided by the aft control handle 13 is a function of the amount of rotation in a given direction.

Referring again to FIG. 2, as shown, the vehicle control system 12 receives a control signal from at least one of the control handle 14 and aft handle 13 and transmits the control signal to traction motor control 27. Traction motor control 27 activates the traction motor 43 which is connected to wheel 45 to provide motive force to the lift truck 10. The speed and direction of the traction motor 43 and associated wheel is selected by the operator from the control handle 14 or aft control handle 13, each of which can provide a control signal to the vehicle control system 12. As the control handle 13 or 14 is rotated, the vehicle control system 12 evaluates the applied control signal or signals and determines the selected direction and speed of travel. Although the control handle 13 and 14 are described here as each including a transducer, each of which provide a control signal to the vehicle control system 12, other methods for providing direction and speed controls to the lift truck 10 are possible. One such method is a mechanical linkage, as described below.

Speed of the lift truck 10 is typically monitored and controlled through an encoder or other feedback device (not shown) coupled to the traction motor 43. The wheel 45 is also connected to friction brake 22 through the drive motor, providing both a service and parking brake function for the lift truck 10. The friction brake 22 is typically spring-applied, and defaults to a "brake on" position. The operator must stand on the deadman pedal, actuating floor switch 20, for the brake to be released. The traction motor 43 is typically an electric motor, and the associated friction brakes 22 can be either an electrically or a hydraulically released device. Although one friction brake 22, traction motor 43, and wheel 45 are shown, the lift truck 10 can include one or more of these elements.

The steer motor control 29 is connected to drive a steer motor 47 and associated steerable wheel 49, steered in a direction selected by the operator by rotating the steering wheel 16, described above. The direction of rotation of the steerable wheel 49 and the travel control command from control handle 13 or 14 determine the direction of motion of the lift truck.

The lift motor control 23 provides command signals to control a lift motor 51 which is connected to a hydraulic circuit 53 for driving the forks 31 along the mast 33, thereby moving the load 35 up or down, depending on the direction selected at the control handle 14. In some applications, the mast 33 can be a telescoping mast. Here, additional hydraulic circuitry can be included to raise or lower the mast 33 as well as the forks 31.

In addition to providing control signals to the drive system and lift control system, the vehicle control system 12 can also supply data to a display 55 for providing information to the operator. Displayed information can include, for example, the weight of a load placed on the forks 31, the speed of the vehicle, the time of day, or the state of charge of the battery 37.

Figure 7:
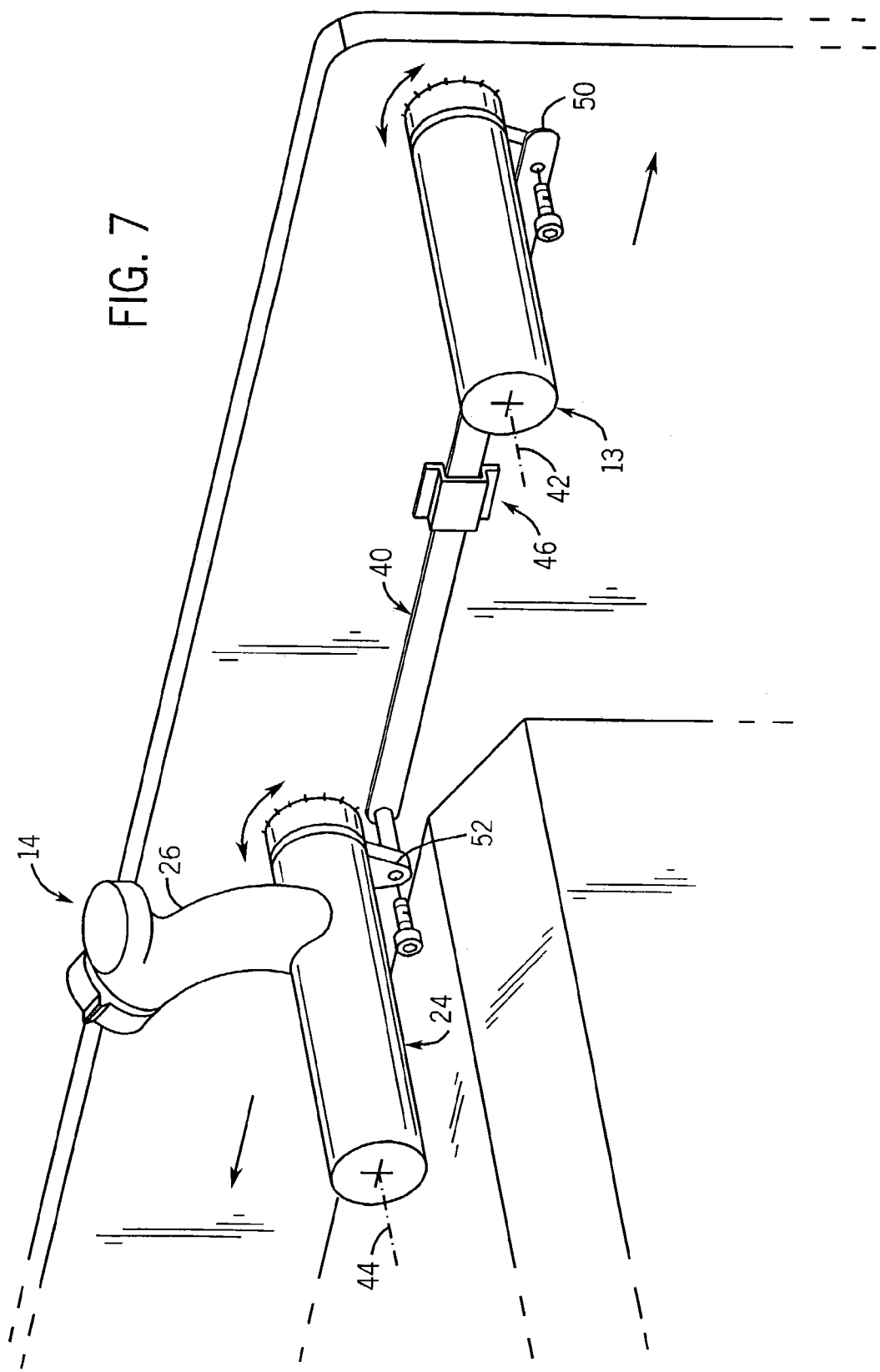
FIG. 7 is a perspective view of a mechanical linkage coupling the multi-function control handle to the aft control handle of FIG. 1.

Referring now to FIG. 7, an alternate method for providing control signals from each of the control handles 14 and 13 is shown. Here, the multi-function control handle 14 and aft control handle 13 are mechanically linked. One of the control handles 13 and 14, preferably control handle 14, includes a transducer for providing a control signal, which is connected to the vehicle control system 12. As one of the handles 13 and 14 is rotated, the other handle is forced to rotate by the linkage, such that the transducer supplies an appropriate signal to the vehicle control system 12 (FIG. 2) irrespective of which handle is used.

The mechanical linkage of FIG. 7 comprises a push/pull bar 40 connecting the aft control handle 13 to the multi-function control handle 14. The aft control handle 13 is connected to the push/pull bar 40 through a bell crank 50 fixed to the end of the aft handle on the side adjacent to operator compartment 11. The bell crank 50 and the aft handle 13 rotate about the aft handle longitudinal axis 42 as shown. The multi-function control handle 14 is similarly connected to the push/pull bar 40 through bell crank 52 fixed to the end of the horizontal section 26 of handle 14 on the side adjacent operator compartment 11. Bell crank 52 and handle 14 rotate about the handle section 26 longitudinal axis 44 as shown. As the aft control handle 13 is rotated in a tractor first travel direction the push/pull bar 40 causes the multi-function control handle 14 to rotate around the axis 44 in the tractor first travel direction and as the aft control handle 13 is rotated in the forks first travel direction the push/pull bar 40 causes the multi-function control handle 14 to rotate around the axis 44 in the forks first travel direction. The vehicle control system 12 receives a control signal indicating the speed and direction of travel only from the multi-function control handle 14, as in this embodiment there is no need for a travel transducer in both handles 13 and 14. In order to minimize or prevent bending of the push/pull bar 40, the push-pull bar 40 motion of the push/pull bar 40 is restricted via a retainer bracket 46 coupled to a wall of the compartment 11. The retainer bracket 46 prevents movement of the push/pull bar 40 away from the wall of the compartment 11 minimizing the amount of lost motion between the rotation of handle 13 and the response of handle 14, while maximizing the space available for the operator's hand and arm.

In addition, or as an alternative to electrical and mechanical systems, the control handles 13 and 14 can also be selectively enabled or disabled using electrical or mechanical switching devices. For example, toggle switches can be provided to selectively enable or disable the control handles 13 and 14. Alternatively, operator control selections could be made via a user interface such as the display 55 coupled to the vehicle control system of FIG. 2 to choose which handle is to be active. Other methods of mechanically linking the two control handles 13 and 14 and for providing directional and speed controls are also possible.

Figure 5:
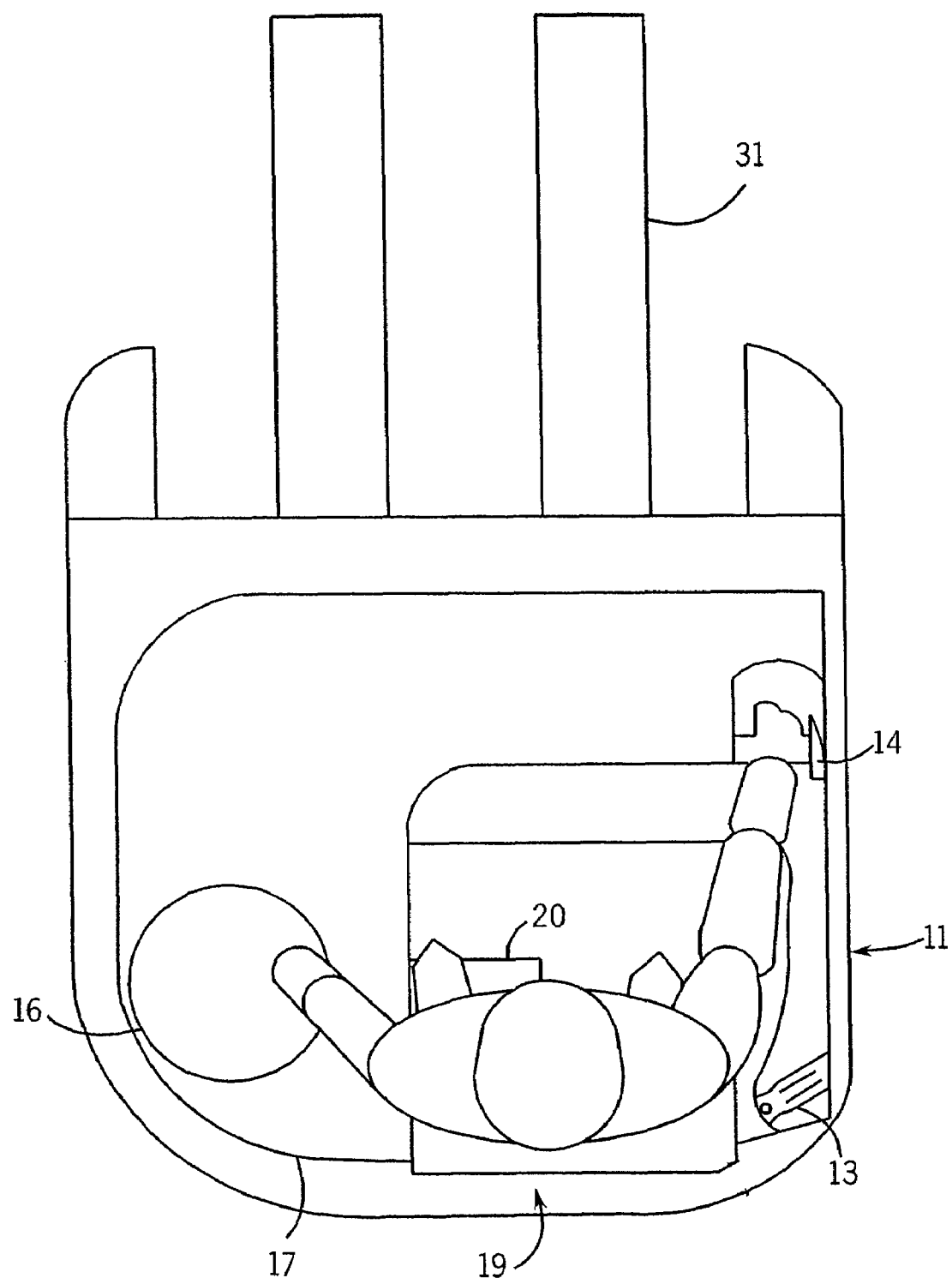
FIG. 5 is a top view of the material handling vehicle with the operator facing fore.

Referring now to FIGS. 1, 4, and 5, as described above, the aft handle 13 is horizontally mounted and is preferably provided as a twist grip style handle having an outer grip 28 constructed of a smooth, material molded to include recessed grooves 30, which provide a comfortable, slip resistant grip. As described above, operation of the handle is simple and intuitive, allowing rotation in the direction of travel when the operator is facing aft, as shown in FIG. 1.

Figure 6:
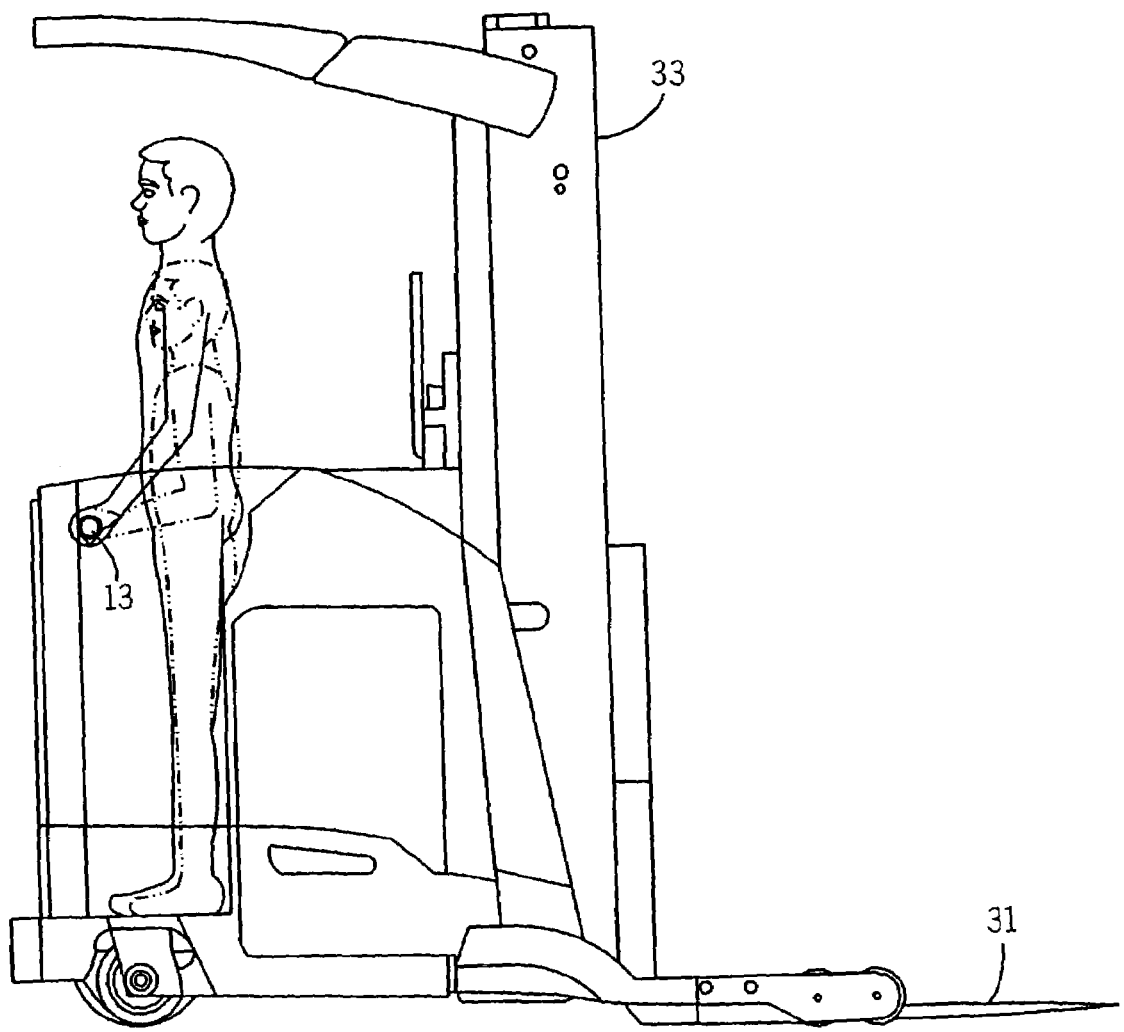
FIG. 6 is a cutaway side view of the material handling vehicle of FIG. 1.

Referring now to FIGS. 1, 5, and 6, in operation, the operator stands in the operator compartment 11 selectively facing either the fore direction (FIG. 5), or the aft direction (FIGS. 1, 6). When operating the vehicle while facing in the fore direction, the operator controls the direction and speed of travel with his or her right hand using the multifunction control handle 14, as described above. The deadman brake floor switch 20 provided on the floor of the operator compartment 11 is positioned to be activated or deactivated by the left foot, and the steering wheel 16 is, likewise, operated by the left hand.

Referring now to FIGS. 1 and 6, while facing in the aft direction of the vehicle and particularly for operating the vehicle in the tractor first direction, the operator controls the direction and speed of travel of the vehicle with his or her left hand using the aft control handle 13, and operates the floor switch 20 and steering wheel 16 with the right foot and hand respectively. While facing either the fore or aft directions, therefore, the operator can control the speed and direction of the lift truck 10 with an operator control handle which is positioned to the side and ahead of the operator's centerline. This arrangement provides improved ease of control, and further provides stability for the operator, allowing the operator to grip a control in the direction the operator is facing. Furthermore, as the operator is not required to reach beside and slightly rearward of his or her centerline when facing in the aft direction to control motion of the vehicle, the operation is more comfortable, which is not only advantageous for the operator, but improves the overall productivity potential of the vehicle by decreasing the need for operator breaks during operation.

Although it is advantageous for the operator to control the travel of lift truck 10 with the multi-function control handle 14 when facing the forks and traveling in the forks first direction and the aft control handle 13 when facing the aft and traveling in the tractor first direction, either control handle 13 or 14 can be used to control the direction and speed of the vehicle in either direction. Typically, however, an operator will elect to control the vehicle with the aft control handle 13 when the lift truck 10 is operated for an extended period of time traveling in the tractor first direction and with the control handle 14 when operating for an extended period of time traveling in the forks first direction and when operating the load handling controls included on multi-function control handle 14.

Although the invention has been described with respect to a stand-up, fore-aft configuration vehicle, it will be apparent that the techniques disclosed can be applied to differing operator orientations in side-stance and seated-operator trucks as well, and nothing disclosed herein should be construed to limit the teaching of the invention to stand-up, fore-aft configuration trucks. Furthermore, while the invention has been described with reference to a lift truck, the invention could be applied to various other types of material handling vehicles. Additionally, although specific control handles and control handle shapes have been described, the size, shape, and orientation of the control handles could be varied without departing from the scope of the invention.

While there has been shown and described what are at present considered the preferred embodiments of the invention, it will be obvious to those skilled in the art that various changes and modifications can be made therein without departing from the scope of the invention defined by the appended claims.

We claim:

1. A material handling vehicle, comprising:
   an operator compartment;
   a first operator control handle for selecting a direction and a speed of travel, the first control handle being mounted at a first position in the operator compartment and configured for operation in a first operator orientation;
   a second operator control handle for selecting a direction and a speed of travel, the second operator control handle being mounted at a second position in the compartment and configured for operation in a second operator orientation opposite the first operator orientation;
   a steering mechanism mounted for access on the operator compartment, the steering mechanism being controlled by the operator to select a direction of motion; and
   a traction system controlled by the first and second operator control handles to drive the vehicle in a selected direction, wherein an operator can control the traction system while in either of the first or the second operator orientations, and wherein the steering mechanism is mounted to be accessible to an operator in the first operator orientation and controlling the first operator control handle and to an operator in the second operator orientation and controlling the second operator control handle.

2. The material handling vehicle as defined in claim 1, wherein the first operator control handle is a multi-function control handle.

3. The material handling vehicle as defined in claim 1, wherein the second operator control handle is substantially horizontal.

4. The material handling vehicle as defined in claim 1, wherein the second operator control handle is a twist grip control.

5. The material handling vehicle as defined in claim 1, wherein the first position is a first end of the operator compartment and the second position is a second end of the operator compartment.

6. The material handling vehicle as defined in claim 1, further comprising a mechanical linkage coupling the first and the second control handles.

7. The material handling vehicle as defined in claim 1, wherein the first operator control handle is a multi-function operator control handle, including a portion which is substantially horizontal, and wherein the substantially horizontal portion is rotated to select the direction and speed of travel of the material handling vehicle.

8. The material handling vehicle as defined in claim 1, wherein the first operator orientation is facing fore in the material handling vehicle and the second operator orientation is facing aft in the material handling vehicle.

9. The material handling vehicle as defined in claim 1, further comprising a floor provided in the compartment, and a deadman switch mounted to the floor in a position accessible by an operator facing the first direction and operating the first control handle and an operator facing the second direction and operating the second control handle.

10. A material handling vehicle comprising:
    a first control handle mounted for access by an operator facing a first direction, the first control handle being rotational in the first direction to produce a control signal selecting motion in the first direction;
    a second control handle mounted for access by an operator facing a second direction opposite the first direction, the second control handle being rotational in the second direction to produce a control signal selecting motion in the second direction;
    a steering mechanism mounted for access by an operator facing the first direction and opperating the first operator control and facing the second direction and operating the second operator control; and
    a traction system for receiving the control signals and for producing a selected direction and a speed of travel of the material handling vehicle.

11. The material handling vehicle as defined in claim 10, wherein the first and second control handles are each rotational around a substantially horizontal axis.

12. The material handling vehicle as defined in claim 10, wherein each of the first and second control handles are rotational in the second and first directions, respectively, to provide a control signal indicative of motion in the direction opposite the direction the operator is facing.

13. The material handling vehicle as defined in claim 10, further comprising a plurality of forks and wherein the first direction is the forks first direction.

14. The material handling vehicle as defined in claim 10, wherein the second control handle is a twist grip control handle.

15. A lift truck, comprising:
    a fork;
    an operator station from which the operator drives the lift truck, the operator station being at least partially surrounded by an enclosure;
    a steering mechanism mounted for access on the enclosure, the steering mechanism being controlled by the operator to select a direction of motion;
    a first operator control mounted for access on the enclosure, the first operator control being provided adjacent the fork and configured for an operator facing the fork to select a direction of travel;
    a second operator control mounted for access on the enclosure, the second operator control being provided near an end of the compartment opposite the fork and configured for an operator facing the end of the lift truck opposite the fork to select a direction of travel; and
    a traction system connected to at least one of the first and second controls to receive a control signal indicative of a direction of travel, wherein the steering mechanism is mounted to be accessible to an operator facing the fork and controlling the first operator control and to an operator facing the end opposite the fork and controlling the second operator control.

16. The lift truck as defined in claim 15, wherein the first control includes a horizontal section which is rotated to provide a speed and a direction signal to the traction system.

17. The lift truck as defined in claim 15, wherein the first control is mounted in the operator control compartment for access during fore stance operation.

18. The lift truck as defined in claim 15, wherein the second control is mounted in the operator compartment for access during aft stance operation.

19. The lift truck as defined in claim 15, wherein the steering mechanism is mounted in the operator compartment for access during each of a fore stance operation and an aft stance operation.

20. The lift truck as defined in claim 15, further comprising a floor switch, the floor switch being positioned in a floor of the operator compartment in a location selected to be accessible by a foot of the operator operating either the first control or the second control.

21. The lift truck as defined in claim 15, further comprising a steering wheel, the steering wheel being mounted to the operator compartment in a location selected to be accessible by an operator operating either the first control or the second control.

22. The lift truck as defined in claim 15, wherein the first control is mounted in the operator compartment for access during fore or aft stance operation.

* * * * *

UNITED STATES PATENT AND TRADEMARK OFFICE
CERTIFICATE OF CORRECTION

| | | |
|---|---|---|
| PATENT NO. | : 7,051,832 B2 | Page 1 of 1 |
| APPLICATION NO. | : 10/631237 | |
| DATED | : May 30, 2006 | |
| INVENTOR(S) | : Gregory W. Smiley et al. | |

It is certified that error appears in the above-identified patent and that said Letters Patent is hereby corrected as shown below:

Column 8, line 26:
"opperating" should be
--operating--.

Signed and Sealed this

Twenty-ninth Day of August, 2006

JON W. DUDAS
*Director of the United States Patent and Trademark Office*